(12) United States Patent
Jiang et al.

(10) Patent No.: US 11,800,477 B2
(45) Date of Patent: Oct. 24, 2023

(54) METHOD AND APPARATUS FOR ACQUIRING UPLINK TRANSMISSION TIMING ADVANCE AND COMMUNICATION SYSTEM

(71) Applicant: FUJITSU LIMITED, Kawasaki (JP)

(72) Inventors: Qinyan Jiang, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/746,025

(22) Filed: May 17, 2022

(65) Prior Publication Data

US 2022/0286990 A1    Sep. 8, 2022

Related U.S. Application Data

(63) Continuation of application No. 16/916,347, filed on Jun. 30, 2020, now Pat. No. 11,368,932, which is a
(Continued)

(51) Int. Cl.
*H04W 56/00*    (2009.01)

(52) U.S. Cl.
CPC .............. *H04W 56/0045* (2013.01)

(58) Field of Classification Search
CPC ......... H04W 56/0015; H04W 56/0045; H04W 56/00; H04W 72/04; H04W 28/18
See application file for complete search history.

(56) References Cited

U.S. PATENT DOCUMENTS

| 7,869,531 B2* | 1/2011 | Deguchi | H04L 5/0016 370/208 |
| 10,638,442 B2* | 4/2020 | Kim | H04W 56/005 |

(Continued)

FOREIGN PATENT DOCUMENTS

| CN | 102695164 A | 9/2012 |
| CN | 102812760 A | 12/2012 |

(Continued)

OTHER PUBLICATIONS

QualcommIncorporated, "RemainingDetailsonRACHProcedure",AgendaItem:7.1.4.2,3GPPTSG-RAN WG1Meeting#91,R1-1720653,Reno,USA, Nov. 27-Dec. 2, 2017 (Year: 2017).*

(Continued)

*Primary Examiner* — Nathan S Taylor
(74) *Attorney, Agent, or Firm* — Myers Wolin, LLC

(57) ABSTRACT

A method and apparatus for acquiring uplink transmission timing advance and a communication system. The method includes: a network device obtains a timing advance command value ($T_A$), the $T_A$ being related to a first reference subcarrier spacing (SCS) used by a terminal equipment for calculating timing advance ($T_{TA}$); and the network device transmits a timing advance command (TA command), the TA command including the $T_A$. Hence, the terminal equipment may be assisted in obtaining accurate timing advance of uplink transmission.

12 Claims, 9 Drawing Sheets

---

```
                                                                      501
┌─────────────────────────────────────────────────────────────────────────┐
│  a network device obtains a timing advance command value (T_A), the T_A │
│  being related to a first reference subcarrier spacing (SCS) used by a  │
│     terminal equipment for calculating timing advance (T_TA)            │
└─────────────────────────────────────────────────────────────────────────┘
                                      │
                                      ▼                               502
┌─────────────────────────────────────────────────────────────────────────┐
│  the network device transmits a timing advance command (TA command),    │
│              the TA command contains the T_A                            │
└─────────────────────────────────────────────────────────────────────────┘
```

Related U.S. Application Data continuation of application No. PCT/CN2018/072163, filed on Jan. 10, 2018.

(56) References Cited

U.S. PATENT DOCUMENTS

| | | | | |
|---|---|---|---|---|
| 11,540,256 | B2* | 12/2022 | Islam | H04W 72/0453 |
| 2011/0200032 | A1 | 8/2011 | Lindström et al. | |
| 2013/0250925 | A1 | 9/2013 | Lohr et al. | |
| 2014/0029586 | A1* | 1/2014 | Loehr | H04W 56/0005 |
| | | | | 370/336 |
| 2015/0003427 | A1 | 1/2015 | Wan et al. | |
| 2016/0088577 | A1* | 3/2016 | Cui | H04W 52/54 |
| | | | | 370/336 |
| 2016/0112975 | A1 | 4/2016 | Dinan | |
| 2016/0174177 | A1 | 6/2016 | Frederiksen et al. | |
| 2016/0192389 | A1 | 6/2016 | Li et al. | |
| 2016/0255654 | A1* | 9/2016 | Lin | H04L 5/0048 |
| | | | | 370/329 |
| 2016/0345316 | A1 | 11/2016 | Kazmi et al. | |
| 2017/0150549 | A1* | 5/2017 | Olsson | H04W 8/02 |
| 2017/0164350 | A1 | 6/2017 | Sun et al. | |
| 2018/0098298 | A1* | 4/2018 | Jung | H04W 74/0833 |
| 2018/0213536 | A1 | 7/2018 | Yang et al. | |
| 2018/0270699 | A1* | 9/2018 | Babaei | H04W 28/0278 |
| 2018/0270700 | A1* | 9/2018 | Babaei | H04W 72/042 |
| 2018/0270713 | A1* | 9/2018 | Park | H04L 5/0053 |
| 2018/0270791 | A1* | 9/2018 | Park | H04W 8/24 |
| 2018/0270792 | A1* | 9/2018 | Park | H04W 68/025 |
| 2018/0270894 | A1* | 9/2018 | Park | H04W 76/14 |
| 2018/0279229 | A1* | 9/2018 | Dinan | H04W 52/367 |
| 2018/0279358 | A1* | 9/2018 | Babaei | H04W 72/14 |
| 2018/0352527 | A1 | 12/2018 | Wang et al. | |
| 2019/0037559 | A1* | 1/2019 | Son | H04W 56/001 |
| 2019/0053182 | A1* | 2/2019 | Choi | H04W 56/0045 |
| 2019/0053228 | A1 | 2/2019 | Akkarakaran et al. | |
| 2019/0082408 | A1* | 3/2019 | Kim | H04W 72/0453 |
| 2019/0141697 | A1* | 5/2019 | Islam | H04L 5/0094 |
| 2019/0191399 | A1* | 6/2019 | Islam | H04W 72/046 |
| 2019/0215048 | A1* | 7/2019 | Cirik | H04B 7/088 |
| 2019/0215861 | A1 | 7/2019 | Son | |
| 2019/0215870 | A1 | 7/2019 | Babaei et al. | |
| 2019/0223178 | A1* | 7/2019 | Bergström | H04W 72/0446 |
| 2020/0221410 | A1* | 7/2020 | Kim | H04L 27/26025 |
| 2020/0221429 | A1* | 7/2020 | Li | H04L 5/0053 |
| 2020/0344723 | A1* | 10/2020 | Babaei | H04W 72/14 |
| 2020/0367187 | A1* | 11/2020 | Palenius | H04L 5/14 |
| 2021/0168749 | A1* | 6/2021 | Turtinen | H04W 80/02 |
| 2021/0185653 | A1* | 6/2021 | Uchino | H04W 74/0833 |
| 2022/0159598 | A1* | 5/2022 | Kim | H04W 72/0446 |

FOREIGN PATENT DOCUMENTS

| | | | |
|---|---|---|---|
| CN | 102227939 B | 9/2013 | |
| CN | 103298136 A | 9/2013 | |
| CN | 106664739 A | 5/2017 | |
| CN | 106993335 A | 7/2017 | |
| CN | 107005989 A | 8/2017 | |
| EP | 3 407 662 A1 | 11/2018 | |
| EP | 3664527 A1 * | 6/2020 | ....... H04L 27/26025 |
| JP | 2014-511640 A | 5/2014 | |

OTHER PUBLICATIONS

International Search Report issued by the State Intellectual Property Office of the P.R. China for corresponding International Patent Application No. PCT/CN2018/072163, dated Sep. 5, 2018, with an English translation.

Written Opinion of the International Searching Authority issued by the State Intellectual Property Office of the P.R. China for corresponding International Patent Application No. PCT/CN2018/072163, dated Sep. 5, 2018, with an English translation.

Extended European search report with supplementary European search report and the European search opinion issued by the European Patent Office for corresponding European Patent Application No. 18899187.1-1205, dated Dec. 4, 2020.

Qualcomm Incorporated, "Remaining Details on RACH Procedure", Agenda Item: 7.1.4.2, 3GPP TSG-RAN WG1 Meeting #91, R1-1720653, Reno, USA, Nov. 27-Dec. 2, 2017.

NTT Docomo, Inc., "Remaining Details on RACH Procedure", Agenda Item: 7.1.4.2, 3GPP TSG-RAN WG1 Meeting #91, R1-1720795, Reno, USA, Nov. 27-Dec. 1, 2017.

CATT, "Further details on NR 4-step RA Procedure", Agenda Item: 7.1.4.2, 3GPP TSG-RAN WG1 Meeting #91, R1-1720174, Reno, USA, Nov. 27-Dec. 1, 2017.

Notice of Preliminary Rejection issued by the Korean Intellectual Property Office for corresponding Korean Patent Application No. 10-2020-7019295, dated Apr. 14, 2021, with an English translation.

Non-Final Office Action issued by the United States Patent and Trademark Office for corresponding U.S. Appl. No. 16/916,347, dated Jun. 10, 2021.

Examination Report issued by The Patent Office of India for corresponding Indian Patent Application No. 202037026262, dated Aug. 31, 2021, with an English translation.

The First Notification of Office Action issued by the China National Intellectual Property Administration for corresponding Chinese Patent Application No. 201880079376.2, dated Sep. 16, 2021, with an English translation.

Huawei et al., "Uplink TA maintenance with multi-beam operation", Agenda Item: 10.3.1.13, 3GPP TSG-RAN WG2 Meeting #100, R2-1713924, Revision of R2-1709273, Reno, Nevada, Nov. 27-Dec. 1, 2017.

Ericsson, "Two different TA sizes for RAR and saving of a byte", Agenda Item: 7.1.6, 3GPP TSG-RAN WG1 Meeting #91, R1-1720947, Reno, Nevada, Nov. 27-Dec. 1, 2017.

Notice of Reasons for Refusal issued by the Japan Patent Office for corresponding Japanese Patent Application No. 2020-537149, dated Sep. 28, 2021, with an English translation.

Final Office Action issued by the United States Patent and Trademark Office for corresponding U.S. Appl. No. 16/916,347, dated Oct. 28, 2021.

Notice of Final Rejection issued by the Korean Intellectual Property Office for corresponding Korean Patent Application No. 10-2020-7019295, dated Jan. 24, 2022, with an English translation.

Notice of Allowance issued by the United States Patent and Trademark Office for corresponding U.S. Appl. No. 16/916,347, dated Feb. 24, 2022.

Communication pursuant to Article 94(3) EPC issued by the European Patent Office for corresponding European Patent Application No. 18 899 187.1-1206, dated Aug. 2, 2022.

First Notification of Office Action and Search Report issued by the China National Intellectual Property Administration for corresponding Chinese Patent Application No. 202210567708.X, dated Apr. 23, 2023, with an English translation.

Huawei et al., "Further discussion on timing advance adjustment accuracy in NR", Agenda Item: 9.7.6.1, 3GPP TSG-RAN WG4 Meeting #84bis, R4-1711248, Dubrovnik, Croatia, Oct. 9-13, 2017.

Ericsson, "Timing advance in NR", Agenda Item: 10.3.1.13, 3GPP TSG-RAN WG2 Meeting #99bis, Tdoc R2-1711168, Revision of R2-1708185, Prague, Czech Republic, Oct. 9-13, 2017.

Notice of Reasons for Refusal issued by the Japan Patent Office for corresponding Japanese Patent Application No. 2022-078571, dated Jul. 11, 2023, with an English translation.

* cited by examiner

METHOD AND APPARATUS FOR ACQUIRING UPLINK TRANSMISSION TIMING ADVANCE AND COMMUNICATION SYSTEM

CROSS REFERENCE TO RELATED APPLICATIONS

This application is a continuation application of U.S. application Ser. No. 16/916,347, which was filed on Jun. 30, 2020, now pending, which is a continuation application of International Application No. PCT/CN2018/072163, filed on Jan. 10, 2018, the entire contents of each are incorporated herein by reference.

FIELD

This disclosure relates to the field of communication technologies, and in particular to a method and apparatus for acquiring uplink transmission timing advance and a communication system.

BACKGROUND

Long term evolution (LTE) adopts timing advance (TA) to maintain the orthogonality of uplink transmission to avoid intra-cell interference. As shown in FIG. 1, for a user equipment (UE), the timing advance is a negative offset between a time when a downlink subframe is received and a time when an uplink subframe is transmitted. A base station offsets different transmission delays of different UEs by appropriately controlling a degree of offset of each UE, thereby ensuring that times of arrival of uplink signals from different UEs to the base station are substantially aligned. In general, the times when the uplink signals from different UEs arrive at the base station are required to fall within a cyclic prefix (CP).

In particular, an uplink synchronization granularity in the LTE is $16 T_s$ ($\approx 5.2$ μs); where, $Ts=1/(15*10^3*2048)$ seconds. After the UE is synchronized with the received downlink transmission for the first time, initial timing advance is obtained via a random access procedure. There is an uplink timing advance command (TA command) of 11 bits in a random access response (RAR) to indicate the initial timing advance. The timing advance command in the RAR received by the UE is $T_A(T_A \in \{0, 1, 2, \ldots, 1282\})$, then the timing advance $T_{TA}=(N_{TA}+N_{TAoffset}) \times T_s$; where, $N_{TA}=T_A \times 16$, $N_{TAoffset}$ is a fixed value dependent on a cell type and a duplex type in a timing advance group (TAG). One UE may be configured with a plurality of TAGs (e.g. an mcg_PTAG, an scg_PTAG, an msg_STAG, and an scg_STAG), uplink transmission timing advance of cells in one TAG being identical. And in receiving the timing advance command for a certain TAG, the UE performs unified adjustment on the uplink timing of the cells in the TAG.

After the initial uplink synchronization of the UE, the base station adjusts the uplink timing of the UE via a control element of a medium access control layer (referred to as an MAC-CE). A structure of an MAC-CE for carrying the timing advance command is as shown in FIG. 2, in which 2 bits are used to indicate a TAG (a TAG ID), and 6 bits are timing advance commands for the TAG. The timing advance command carried by the MAC-CE received by the UE is $T_A(T_A \in \{0, 1, 2, \ldots, 63\})$, then the timing advance is $T_{TA}=(N_{TA\_new}+N_{TAoffset}) \times T_s$; where, $N_{TA\_new}=N_{TA\_old}+(T_A-31) \times 16$, $N_{TA\_old}$ is a value of $N_{TA}$ before the timing advance command is received.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a new radio (NR) system, a plurality of types of subcarrier spacings (SCSs) are supported, a correspondence between the SCSs and uplink synchronization granularities (Unit) being as shown in the table below:

| SCS | Granularities |
|---|---|
| 15 | $16*64 T_c$ |
| 30 | $8*64 T_c$ |
| 60 | $4*64 T_c$ |
| 120 | $2*64 T_c$ |

$T_c=1/(64*30.72*10^6)$ seconds, a meaning of T, being identical to that in an existing standard, which is incorporated herein.

It may be expressed by the formula as below:

$$\text{Unit}=16 \cdot 64 \cdot T_c/2^\mu, \mu=0,1,2,3.$$

A correspondence between values of μ and the SCSs is as shown in the table below:

| μ | $\Delta f = 2^\mu \cdot 15$ [kHz] |
|---|---|
| 0 | 15 |
| 1 | 30 |
| 2 | 60 |
| 3 | 120 |

Where, $\Delta f$ characterizes values of the SCSs.

It can be seen that for the TA command in the MAC-CE, as the uplink synchronization granularities to which different SCSs corresponds are different, for TA commands including identical timing advance command values ($T_A$ values), that is bit information of the TA commands shown in FIG. 2 is identical, and if the identical $T_A$ values are correlated with different SCSs, actually indicated timing advance is different. For example, if timing advance command values ($T_A$ values) in two TA commands are identical and the two $T_A$ values are respectively correlated with an SCS of 15 kHz and an SCS of 30 kHz, an amount of adjustment of timing advance actually indicated by the $T_A$ value correlated with 15 kHz is twice the latter.

Thus, when the UE receives a TA command, if a SCS to which the timing advance command value ($T_A$ value) in the TA command understood by the UE corresponds is different from a SCS to which the timing advance command value ($T_A$ value) in the TA command actually corresponds, the UE may be unable to obtain accurate uplink transmission timing advance, which may affect orthogonality of the uplink transmission, and may increase intra-cell interference.

In order to solve the above problems, embodiments of this disclosure provide a method and apparatus for acquiring uplink transmission timing advance and a communication system, so as to assist a UE in obtaining accurate uplink transmission timing advance.

According to a first aspect of the embodiments of this disclosure, there is provided a method for acquiring uplink transmission timing advance, including: obtaining a timing advance command value ($T_A$) by a network device, the $T_A$ being related to a first reference subcarrier spacing (SCS) used by a terminal equipment for calculating timing advance ($T_{TA}$); and transmitting a timing advance command ($T_A$ command) by the network device, the TA command including the $T_A$.

According to a second aspect of the embodiments of this disclosure, there is provided a method for acquiring uplink transmission timing advance, including: receiving a timing advance command (TA command) by a terminal equipment, so as to obtain a timing advance command value ($T_A$) in the TA command; and determining, by the terminal equipment, a first reference subcarrier spacing (SCS) related to the $T_A$ and used for calculating timing advance ($T_{TA}$).

According to a third aspect of the embodiments of this disclosure, there is provided an apparatus for acquiring uplink transmission timing advance, configured in a network device, the apparatus including: an acquiring unit configured to obtain a timing advance command value ($T_A$), the $T_A$ being related to a first reference subcarrier spacing (SCS) used by a terminal equipment for calculating timing advance ($T_{TA}$); and a transmitting unit configured to transmit a timing advance command ($T_A$ command), the $T_A$ command including the $T_A$.

According to a fourth aspect of the embodiments of this disclosure, there is provided an apparatus for acquiring uplink transmission timing advance, configured in a terminal equipment, the apparatus including: a receiving unit configured to receive a timing advance command (TA command), so as to obtain a timing advance command value ($T_A$) in the TA command; and a determining unit configured to determine a first reference subcarrier spacing (SCS) related to the $T_A$ and used for calculating timing advance ($T_{TA}$).

According to a fifth aspect of the embodiments of this disclosure, there is provided a method for adjusting uplink transmission timing advance, including: receiving a timing advance command (TA command) by a terminal equipment, the TA command including a timing advance command value ($T_A$); determining adjusted uplink transmission timing by the terminal equipment based on the $T_A$; and applying the adjusted uplink transmission timing by the terminal equipment after a first time point; wherein, the first time point is correlated with a second reference SCS, the second reference SCS being predefined or preconfigured, and/or, the first time point is correlated with an operating band of a serving cell of the terminal equipment.

According to a sixth aspect of the embodiments of this disclosure, there is provided an apparatus for adjusting uplink transmission timing advance, including: a receiving unit configured to receive a timing advance command (TA command), the TA command including a timing advance command value ($T_A$); a determining unit configured to determine adjusted uplink transmission timing based on the $T_A$; and a processing unit configured to apply the adjusted uplink transmission timing after a first time point; wherein, the first time point is correlated with a second reference SCS, the second reference SCS being predefined or preconfigured, and/or, the first time point is correlated with an operating band of a serving cell of the terminal equipment.

According to a seventh aspect of the embodiments of this disclosure, there is provided an activation method for an uplink bandwidth part (BWP), including:

receiving configuration information from a network device at an n-th time unit by a terminal equipment, the configuration information being used to indicate an active uplink BWP to the terminal equipment; and using the active uplink BWP starting from an (n+k)-th time unit by the terminal equipment; where, n is a natural number, k is a positive integer and is greater than or equal to K, K is the number of time units between receiving a TA command and applying uplink transmission timing which has been adjusted based on the TA command, and the time unit is a symbol, a slot, a sub-slot, or a subframe.

According to an eighth aspect of the embodiments of this disclosure, there is provided an activation apparatus for an uplink bandwidth part (BWP), including: a receiving unit configured to receive configuration information from a network device at an n-th time unit, the configuration information being used to indicate an active uplink BWP to the terminal equipment; and a processing unit configured to use the active uplink BWP starting from an (n+k)-th time unit; where, n is a natural number, k is a positive integer and is greater than or equal to K, K is the number of time units between receiving a TA command and applying uplink transmission timing which has been adjusted based on the TA command, and the time unit is a symbol, a slot, a sub-slot, or a subframe.

According to a ninth aspect of the embodiments of this disclosure, there is provided a network device, including the apparatus as described in the third aspect.

According to a tenth aspect of the embodiments of this disclosure, there is provided a terminal equipment, including the apparatus as described in the fourth aspect, or the sixth aspect, or the eighth aspect.

According to an eleventh aspect of the embodiments of this disclosure, there is provided a communication system, including the network device as described in the ninth aspect and the terminal equipment as described in the tenth aspect.

According to another aspect of the embodiments of this disclosure, there is provided a computer readable program, which, when executed in a network device, may cause a computer to carry out the method as described in the first aspect in the network device.

According to a further aspect of the embodiments of this disclosure, there is provided a computer storage medium, including a computer readable program, which may cause a computer to carry out the method as described in the first aspect in a network device.

According to yet another aspect of the embodiments of this disclosure, there is provided a computer readable program, which, when executed in a terminal equipment, may cause a computer to carry out the method as described in the second aspect, or the fifth aspect, or the seventh aspect, in the terminal equipment.

According to still another aspect of the embodiments of this disclosure, there is provided a computer storage medium, including a computer readable program, which may cause a computer to carry out the method as described in the second aspect, or the fifth aspect, or the seventh aspect, in a terminal equipment.

An advantage of the embodiments of this disclosure exists in that the timing advance command value ($T_A$) in the timing advance (TA) command transmitted by the network device is correlated with the reference SCS (referred to as a first SCS) used by the terminal equipment in calculating the timing advance ($T_{TA}$). Hence, the user equipment may be assisted in obtaining accurate timing advance of uplink transmission.

With reference to the following description and drawings, the particular embodiments of this disclosure are disclosed in detail, and the principle of this disclosure and the manners of use are indicated. It should be understood that the scope of the embodiments of this disclosure is not limited thereto.

The embodiments of this disclosure include many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
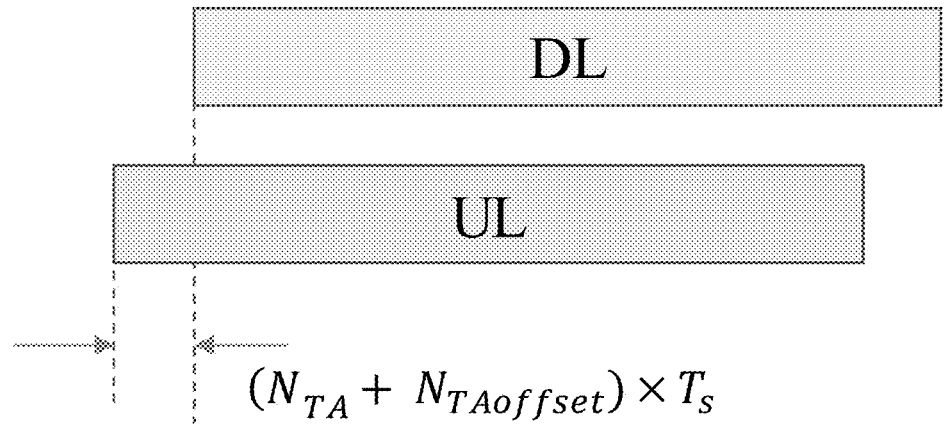
FIG. 1 is a schematic diagram of a concept of the timing advance.
Figure 2:
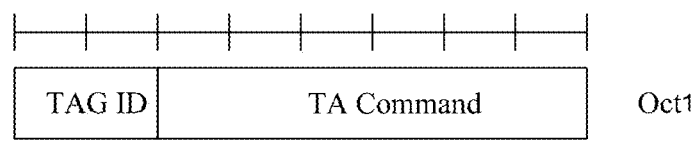
FIG. 2 is a schematic diagram of a format of an MAC-CE.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses terminal equipment to the communication network and provides services for the terminal equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

Figure 3:
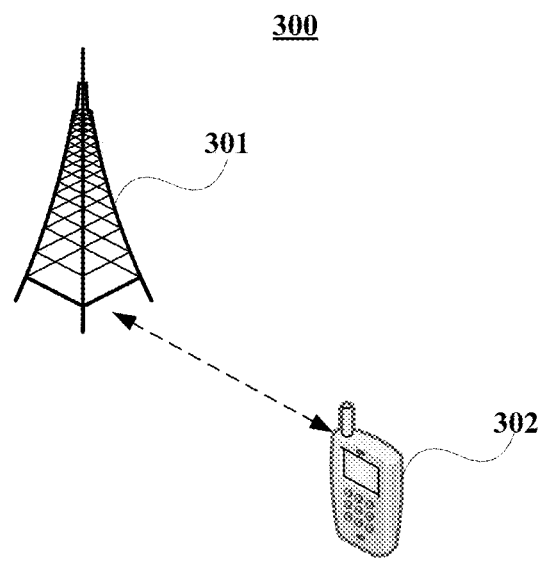
FIG. 3 is a schematic diagram of a communication system of an embodiment of this disclosure.

FIG. 3 is a schematic diagram of a communication system of an embodiment of this disclosure, in which a case where a terminal equipment and a network device are taken as examples is schematically shown. As shown in FIG. 3, a communication system 300 may include a network device 301 and a terminal equipment 302. For the sake of simplicity, FIG. 3 shall be described by taking only one terminal equipment and one network device as an example; however, the embodiment of this disclosure is not limited thereto.

In the embodiment of this disclosure, existing traffics or traffics that may be implemented in the future may be performed between the network device 303 and the terminal equipment 302. For example, such traffics may include but not limited to an enhanced mobile broadband (eMBB), massive machine type communication (MTC), and ultra-reliable and low-latency communication (URLLC).

The terminal equipment 302 may transmit data to the network device 301, such as by using a grant-free transmission mode. The network device 301 may receive data transmitted by one or more terminal equipments 302, and feed back information (such as acknowledgement (ACK)/non-acknowledgement (NACK) information) to the terminal equipment 302, and according to the feedback information, the terminal equipment 302 may determine to terminate a transmission process, or may perform new transmission of data, or may perform retransmission of data.

In the NR system, a concept of a bandwidth part (BWP) is introduced, and one downlink (DL)/uplink (UL) bandwidth contains a plurality of BWPs. Each UE may be semi-statically configured with one or more DL/UL BWPs, and one or more of the DL/UL BWPs may be activated at the same time to receive/transmit uplink and downlink data. And such parameters as an SCS supported by the BWPs are independently configured.

Figure 4:
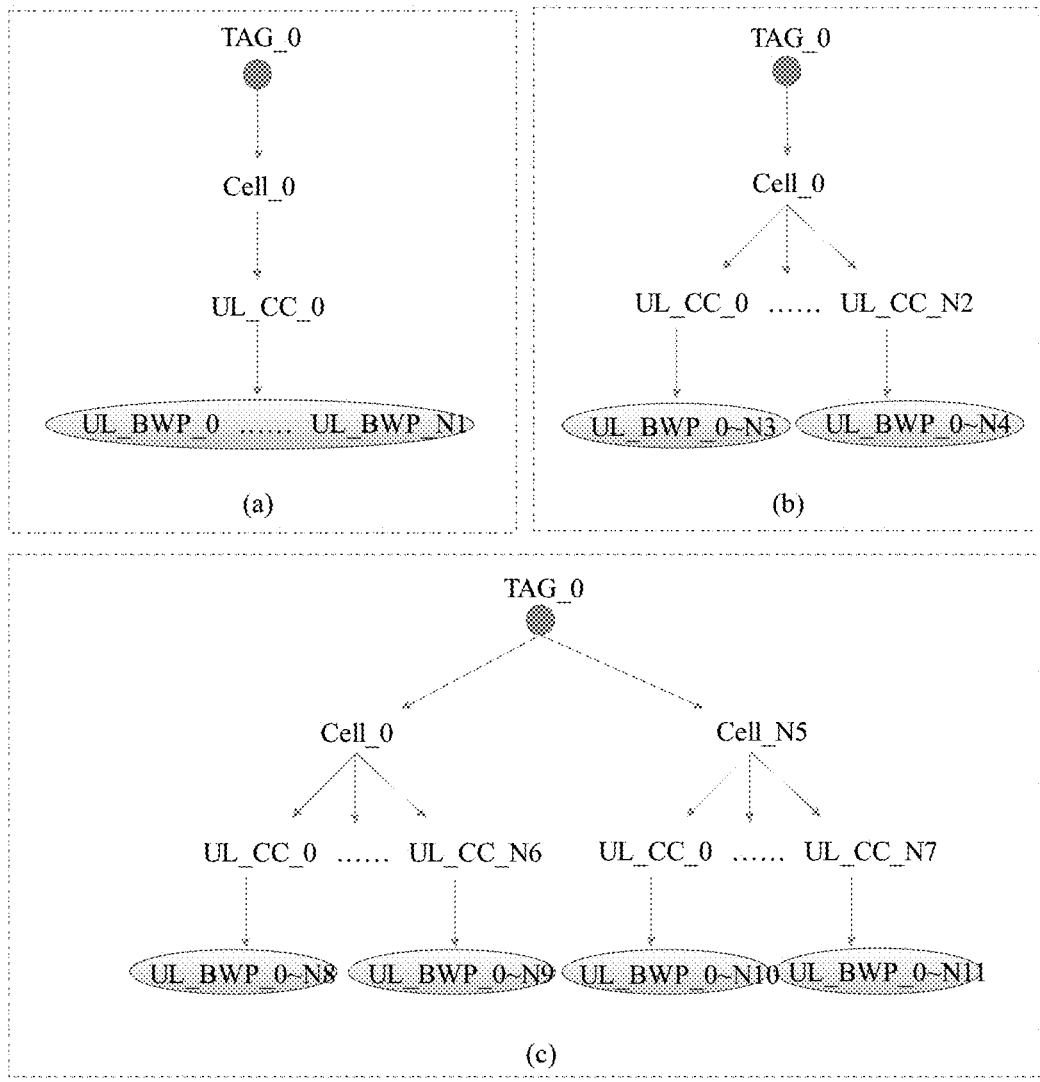
FIG. 4 is a schematic diagram of a scenario where one TAG includes a plurality of UL BWPs.

In general, one TAG includes at least one cell, and one cell supports at least one uplink component carrier (UL CC), such as including a supplemental UL (SUL) and a non-supplementary UL, and one UL CC may semi-statically configure at least one UL BWP. FIG. 4 gives a schematic diagram of a scenario in which one TAG includes one or more semi-statically configured UL BWPs.

In the embodiment of this disclosure, after receiving a TA command for a certain TAG, the UE may calculate timing advance according to a reference SCS and its corresponding uplink synchronization granularity. If the reference SCS on the UE side is determined according to a predefined rule, as the UL BWP configuration may possibly change after the TA command is received, the reference SCS at the UE side may also change (enlarge or reduce).

For example, if the reference SCS at the UE side is an SCS determined according to a predefined rule of semi-statically configured UL BWP(s) in the TAG, such as a maximum or minimum SCS, after the UE receives the TA command, the base station indicates via control signaling (such as RRC signaling) the UE to update a semi-statically configured UL BWP set in the TAG, and accordingly, its reference SCS changes.

For another example, if the reference SCS at the UE side is an SCS determined according to a predefined rule of the UL BWP(s) activated in the TAG, such as a maximum or minimum SCS, after the UE receives the TA command, the base station indicates via control signaling, such as RRC signaling (such as Active-BWP-UL-SCell), MAC-CE, DCI (downlink control information, e.g. DCI format 0_1), the UE to activate and/or deactivate the UL BWP, and accordingly, its reference SCS changes. Alternatively, after receiving the TA command, the UE activates and/or deactivates the UL BWP based on a timer, and accordingly, its reference SCS changes. A value of the timer may be configured by the base station via RRC signaling (BWP-InactivityTimer).

Implementations of the embodiments of this disclosure shall be described below with reference to the accompanying drawings. These implementations are illustrative only, and are not intended to limit this disclosure.

Embodiment 1

Figure 5:
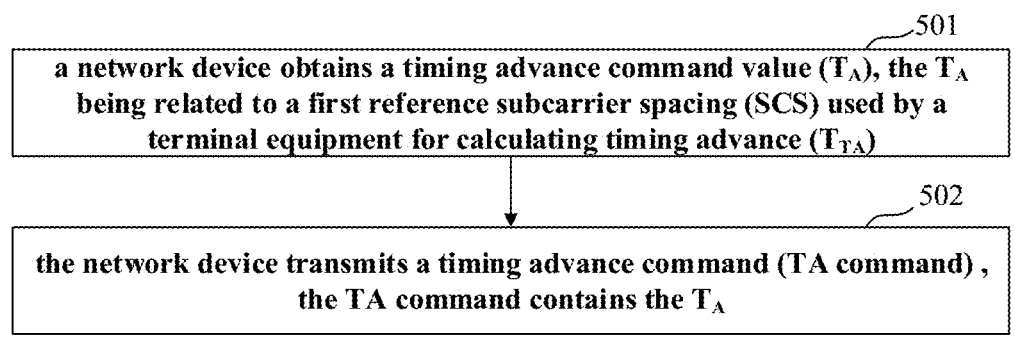
FIG. 5 is a schematic diagram of the method for acquiring uplink transmission timing advance of Embodiment 1.

The embodiment of this disclosure provides a method for acquiring uplink transmission timing advance, applicable to a network device, such as a gNB (a base station in NR), or the like. FIG. 5 is a schematic diagram of the method for acquiring uplink transmission timing advance of this embodiment. Referring to FIG. 5, the method includes:
step 501: a network device obtains a timing advance command value ($T_A$), the $T_A$ being related to a first reference subcarrier spacing (SCS) used by a terminal equipment for calculating timing advance ($T_{TA}$); and
step 502: the network device transmits a timing advance command (TA command), the TA command including the $T_A$.

In this embodiment, since the timing advance command ($T_A$) transmitted by the network device is related to the reference SCS used by the terminal equipment in calculating the timing advance ($T_{TA}$), it may be ensured that understanding for the reference SCS by the terminal equipment is in consistence with understanding for a reference SCS at the terminal equipment side by the network device, so as to assist the terminal equipment in obtaining accurate timing advance of uplink transmission.

In one implementation, the above first reference SCS related to the $T_A$ and used for calculating the $T_{TA}$ is predefined or preconfigured, and may be a reference SCS at the terminal equipment side when the TA command is effective, or may be a reference SCS at the terminal equipment side when the network device transmits the TA command or the terminal equipment receives the TA command. In this implementation, the reference SCS at the terminal equipment side may be the maximum or minimum SCS of the semi-statically configured UL BWP(s) in the TAG to which the above TA command corresponds, or may be the maximum or minimum SCS of the UL BWP(s) activated in the TAG to which the above TA command corresponds.

In this implementation, if the terminal equipment receives the TA command at a time t and the TA command is effective after a certain time interval (such as a time t+T), the time t+T is referred to as an effective time of the TA command, that is, from the time t+T, the terminal equipment starts to perform uplink transmission by using the uplink transmission timing advance updated based on the TA command. For example, if the terminal equipment receives the TA command at an n-th time unit, the TA command is effective at an (n+N)-th (N>0, for example, N=6) time unit, that is, from the (n+N)-th time unit, the terminal equipment starts to perform uplink transmission by using the uplink transmission timing advance (uplink transmission timing adjustment amount) obtained based on the TA command. Here, the time unit may be a symbol, a slot, a sub-slot, or a subframe. One slot includes 14 symbols, and one sub-slot includes less than 14 symbols.

Figure 6:
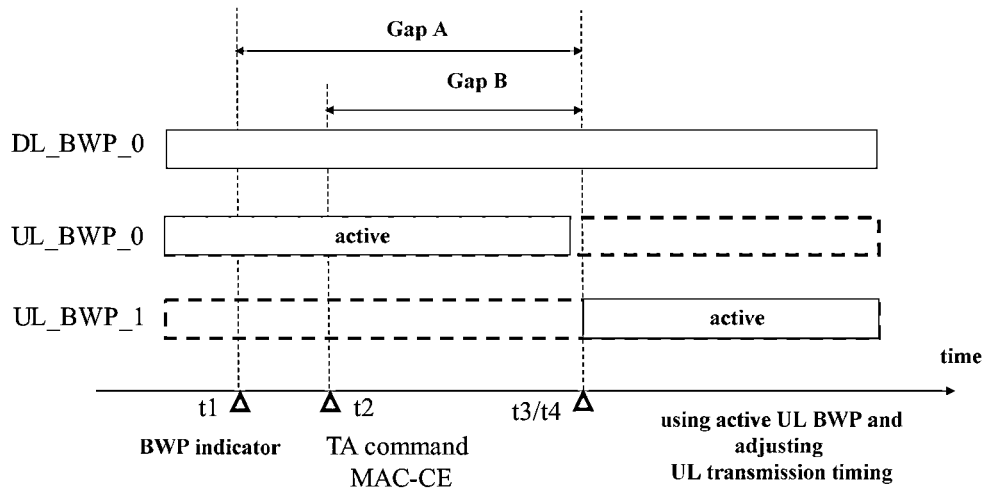
FIG. 6 is a schematic diagram of an effective time of a TA command.

In this implementation, in order to ensure that the network device side and the terminal equipment side have the same understanding for the reference SCS at the terminal equipment side when the $T_A$ command is effective, an interval Gap A (t3−t1) from a time (t1) when the network device indicates BWP configuration to a time (t3) when the terminal equipment updates the BWP configuration according to the indication may be greater than an interval Gap B (t4−t2) from a time (t2) when the network device transmits the TA command to a time (t4) when the TA command is effective, as shown in FIG. 6.

In another implementation, the first reference SCS associated with the above $T_A$ and used for calculating the $T_{TA}$ is designated by the network device. In this implementation, the network device may transmit control signaling to the terminal equipment, indicating to the terminal equipment the reference SCS associated with the above $T_A$, used for calculating the $T_{TA}$ and designated by it. The control signaling here is, for example, radio resource control (RRC) signaling, an MAC-CE, and downlink control information (DCI), and the like; however, this embodiment is not limited thereto. Furthermore, the above RRC signaling is, for example, an Active-BWP-UL-SCell, the MAC-CE is, for example, a $T_A$ command MAC-CE, and the DCI is, for example, a DCI format 0_1.

In yet another implementation, the above two implementations may be used in a combined manner. For example, if the network device does not indicate to the terminal equipment via the above control signaling the reference SCS associated with the above $T_A$, used for calculating the $T_{TA}$ and designated by it, the terminal equipment may calculate the timing advance according to a reference SCS determined according to a predefined rule described above; and if the network device indicates to the terminal equipment via the above control signaling the reference SCS associated with the above $T_A$, used for calculating the $T_{TA}$ and designated by it, and the terminal equipment may calculate the timing advance according to the designated reference SCS.

With the method of this embodiment, the network device transmits via the TA command the timing advance value ($T_A$) related to the reference SCS used by the terminal equipment in calculating the timing advance ($T_{TA}$), and it may be ensured that understanding for the reference SCS by the terminal equipment is in consistence with understanding for a reference SCS at the terminal equipment side by the network device, so as to assist the terminal equipment in obtaining accurate timing advance of uplink transmission.

Embodiment 2

Figure 7:
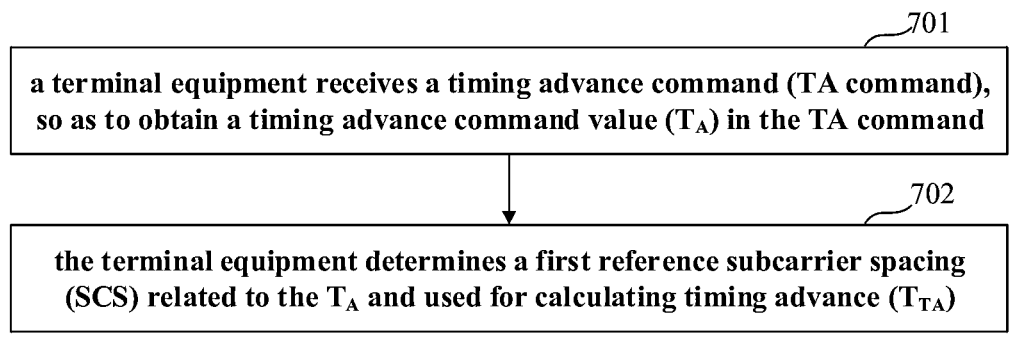
FIG. 7 is a schematic diagram of the method for acquiring uplink transmission timing advance of Embodiment 2.

The embodiment of this disclosure provides a method for acquiring uplink transmission timing advance, applicable to a terminal equipment. This embodiment is processing at a terminal equipment side corresponding to the method of Embodiment 1, with contents identical to those in Embodiment 1 being not going to be described herein any further. FIG. 7 is a schematic diagram of the method for acquiring uplink transmission timing advance of this embodiment. Referring to FIG. 7, the method includes:

step 701: a terminal equipment receives a timing advance command (TA command), so as to obtain a timing advance command value ($T_A$) in the TA command; and step 702: the terminal equipment determines a first reference subcarrier spacing (SCS) related to the $T_A$ and used for calculating timing advance ($T_{TA}$).

In one implementation of this embodiment, as described in Embodiment 1, the first reference subcarrier spacing (SCS) related to the $T_A$ and used for calculating the timing advance ($T_{TA}$) is predefined or preconfigured, such as a reference SCS at the terminal equipment side when the TA command is effective, or a reference SCS at the terminal equipment side when the network device transmits the TA command or the terminal equipment receives the TA command. Here, the reference SCS at the terminal equipment side may be a maximum or minimum SCS of semi-statically configured uplink bandwidth part(s) (UL BWP(s)) in a timing advance group (TAG) to which the above TA command corresponds, or the reference SCS at the terminal equipment side may be a maximum or minimum SCS of active UL BWP(s) in a TAG to which the TA command corresponds.

In another implementation of this embodiment, as described in Embodiment 1, the first reference SCS related to the $T_A$, used for calculating the $T_{TA}$ is an SCS and designated by the network device. In this implementation, the terminal equipment may receive control signaling transmitted by the network device, the control signaling indicating the first reference SCS related to the $T_A$, used for calculating the $T_{TA}$ and designated by the network device.

In this embodiment, the terminal equipment may calculate the timing advance ($T_{TA}$) based on the first reference SCS related to the $T_A$ and used for calculating the $T_{TA}$. Alternatively, the terminal equipment may calculate or adjust the timing advance ($T_{TA}$) based on the reference SCS at the terminal equipment side to which the uplink transmission time (or time unit) corresponds. Here, the time unit may be a symbol, a slot, a sub-slot, or a subframe. One slot includes 14 symbols, and one sub-slot includes less than 14 symbols. A meaning of the reference SCS at the terminal equipment side is identical to that as described above, which shall not be described herein any further.

A method for calculating the timing advance ($T_{TA}$) by the terminal equipment shall be described below by way of an example. In the following example, the network device being a gNB and the terminal device being a UE are taken as an example.

It is assumed that a value of the TA command received by the UE at a time t (or an n-th time unit) is $T_A$ (for example, $T_A \in \{0, 1, 2 \ldots, 63\}$), and the TA command is effective at a time t+T (or an (n+N)-th time unit).

It is assumed that an uplink synchronization granularity to which a reference SCS (such as SCS_0) of the UE at the time t (or the n-th time unit) corresponds is $Unit_t=16\cdot64\cdot T_c/2^{\mu 0}$, an uplink synchronization granularity to which a reference SCS (such as SCS_1) at the time t+T (or the (n+N)-th time unit) corresponds is $Unit_{t+T}=16\cdot64\cdot T_c/2^{\mu 1}$, an uplink synchronization granularity to which a reference SCS (such as SCS_2) at an uplink transmission time (or a time unit after the time t+T (or the (n+N)-th time unit) corresponds is $Unit+_{t+T+?}=16\cdot64\cdot T_c/2^{\mu 2}$, and the gNB designates and informs to the UE that an uplink synchronization granularity to which an SCS (such as SCS_3) corresponds is $Unit_{gNB\_selected}=16\cdot64\ T_c/2^{\mu 3}$. In the above assumptions, values of SCS_0, SCS_1, SCS_2 and SCS_3 may be identical or different, and correspondingly, values of $\mu_0$, $\mu_1$, $\mu_2$ and $\mu_3$ may also be identical or different.

In one implementation, as described above, the UE may calculate the timing advance ($T_{TA}$) based on the first reference SCS related to the $T_A$ and used for calculating the $T_{TA}$.

In this implementation, the reference SCS of the UE for calculating the timing advance ($T_{TA}$) is the first reference SCS related to the timing advance command value ($T_A$), and the UE may determine the corresponding uplink synchronization granularity according to the first reference SCS related to the timing advance command value ($T_A$), and calculate the timing advance ($T_{TA}$).

If the first reference SCS related to the timing advance command value ($T_A$) is predefined or preconfigured and is the reference SCS (SCS_0) at the UE side when the gNB transmits the $T_A$ command or the UE receives the TA command, the updated timing advance ($T_{TA}$) calculated by the UE according to the timing advance command value ($T_A$) at the time t (or the n-th time unit) is:

$$T_{TA}=(N_{TA\_new}+N_{TA,offset})\times T_c;$$

where, $N_{TA\_new}=N_{TA\_old}+(T_A-31)\cdot 16\cdot64/2^{\mu 0}$.

If the first reference SCS related to the timing advance command value ($T_A$) is predefined or preconfigured and is the reference SCS (SCS_1) at the UE side when the TA command is effective, the updated timing advance ($T_{TA}$) calculated by the UE according to the TA command ($T_A$) at the time t (or the n-th time unit) is:

$$T_{TA}=(N_{TA\_new}+N_{TA,offset})\times T_c;$$

where, $N_{TA\_new}=N_{TA\_old}+(T_A-31)\cdot 16\cdot64/2^{\mu 1}$.

If the first reference SCS related to the timing advance command value (TA) is the SCS (SCS_3) designated by the base station and informed to the UE, the updated timing advance ($T_{TA}$) calculated by the UE according to the TA command ($T_A$) at the time t (or the n-th time unit) is:

$$T_{TA}=(N_{TA\_new}+N_{TA,offset})\times T_c;$$

where, $N_{TA\_new}=N_{TA\_old}+(T_A-31)\cdot 16\cdot64/2^{\mu 3}$.

In the above formulae, the value of $N_{TA,offset}$ is determined according to a TAG type to which the TA command corresponds, a duplex mode (FDD or TDD) when the uplink transmission occurs, and a frequency range (FR), etc.

For example,
if a relationship between the value of $N_{TA,offset}$ and the TAG type is taken into account,
if the TAG includes a primary cell and/or a primary secondary cell (PCell/PSCell), or the TAG does not include the PCell/PSCell but serving cells therein have identical duplex modes, $N_{TA,offset}$ is 0;
if the TAG does not include the PCell/PSCell and the serving cells therein have different duplex modes, the value of $N_{TA,offset}$ is related to the frequency range, which may be as shown in the table below:

| Frequency range | $N_{TA\_offset}$ |
|---|---|
| FR1 (<6 GHz) | 25560 |
| FR2 (>6 GHz) | 13763 |

For another example,
if the relationship between value of $N_{TA,offset}$ and the duplex mode and the relationship between the value of $N_{TA,offset}$ and the frequency range are only taken into account, the value of $N_{TA,offset}$ may be expressed by, for example, the table below:

| Duplex mode of a cell used for uplink transmission | $N_{TA\_offset}$ |
|---|---|
| FDD in FR1 or FR2 | 0 (Note) |
| TDD in FR1 | 25560 |
| TDD in FR2 | 13763 |

Note:
despite of whether coexistence of LTE and NR is configured in FR1

In this example, it is required that duplex modes of serving cells in the same TAG are identical.

In this implementation, even though a reference SCS after the time t+T (or the (n+N)-th time unit) changes, after the TA command is effective (the time t+T) and before a next TA command is received, the UE keeps $N_{TA}$ unchanged, and before the next TA command is effective, the UE still uses the above timing advance ($T_{TA}$).

In another implementation, as described above, the UE may calculate or adjust the above timing advance ($T_{TA}$) based on the reference SCS at the UE side to which the uplink transmission time corresponds.

In this implementation, the reference SCS of the UE for calculating or adjusting the timing advance ($T_{TA}$) is the reference SCS to which the uplink transmission time corresponds, the corresponding uplink synchronization granularity is determined according to the reference SCS to which the uplink transmission time corresponds, and the timing advance ($T_{TA}$) is calculated or adjusted.

If the first reference SCS related to the timing advance command value ($T_A$) is SCS_0, the updated timing advance ($T_{TA}$) calculated by the UE according to the TA command ($T_A$) at the time t (or the n-th time unit) is:

$$T_{TA}=(N_{TA\_new}+N_{TA,offset})\times T_c;$$

where, $N_{TA\_new}=N_{TA\_old}+(T_{A\_new}-0.31)\cdot 16\cdot64/2^{\mu 2}$ wherein, $T_{A\_new}=\lceil T_A\cdot 2^{(\mu 2-\mu 0)}\rceil$ (rounded up), or, $T_{A\_new}=\lfloor T_A\cdot 2^{(\mu 2-\mu 0)}\rfloor$ (rounded down).

If the first reference SCS related to the timing advance command value ($T_A$) is SCS_1, the updated timing advance ($T_{TA}$) calculated by the UE according to the TA command ($T_A$) at the time t (or the n-th time unit) is:

$$T_{TA}=(N_{TA\_new}+N_{TA,offset})\times T_c;$$

where, $N_{TA\_new}=N_{TA\_old}+(T_{A\_new}-0.31)\cdot 16\cdot64/2^{\mu 2}$ wherein, $T_{A\_new} = \lceil T_A \cdot 2^{(\mu_2 - \mu_1)} \rceil$ (rounded up), or, $T_{A\_new} = \lfloor T_A \cdot 2^{(\mu_2 - \mu_1)} \rfloor$ (rounded down).

If the first reference SCS related to the timing advance command value ($T_A$) is SCS_3, the updated timing advance ($T_{TA}$) calculated by the UE according to the TA command ($T_A$) at the time t (or the n-th time unit) is:

$T_{TA} = (N_{TA\_new} + N_{TA,offset}) \times T_c$;

where, $N_{TA\_new} = N_{TA\_old} + (T_{A\_new} - 0.31) \cdot 16 \cdot 64 / 2^{\mu_2}$ wherein, $T_{A\_new} = \lceil T_A \cdot 2^{(\mu_2 - \mu_3)} \rceil$ (rounded up), or, $T_{A\_new} = \lfloor T_A \cdot 2^{(\mu_2 - \mu_3)} \rfloor$ (rounded down).

In this implementation, after the TA command is effective (the time t+T) and before a next TA command is received and the next TA command is effective, the value of $\mu_2$ changes along with a change of the reference SCS to which the uplink transmission time of the UE corresponds.

In the above-described two implementations, description is given by taking that the terminal equipment calculates the timing advance ($T_{TA}$) based on the first reference SCS related to the $T_A$ and used for calculating the $T_{TA}$ as an example, that is, the terminal equipment directly determines the adjusted timing advance, and then determines the uplink transmission timing. However, this embodiment is not limited thereto, and the terminal equipment may first determine an amount of adjustment relative to current timing advance, and further determines the uplink transmission timing. And reference may be made to the previous implementations for a method for determining the relative amount of adjustment, which shall not be described herein any further.

With the method of this embodiment, when the UL BWP of the uplink transmission of the terminal equipment changes, the network device and the terminal equipment may uniquely determine the timing advance after the UL BWP changes, and the network device may further adjust the uplink timing of the terminal equipment via the control signaling according to the reference value.

Embodiment 3

The embodiment of this disclosure provides an apparatus for acquiring uplink transmission timing advance, which may be configured in a network device, such as a gNB (a base station in NR). As principles of the apparatus for solving problems are similar to that of the method of Embodiment 1, reference may be made to implementation of the method of Embodiment 1 for a particular implementation of this apparatus, with identical contents being not going to be described herein any further.

Figure 8:
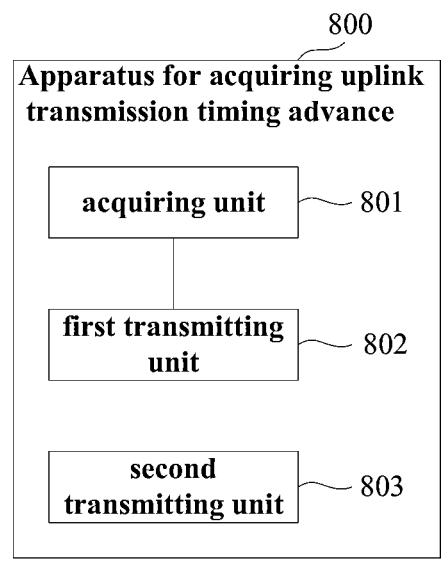
FIG. 8 is a schematic diagram of the apparatus for acquiring uplink transmission timing advance of Embodiment 3.

FIG. 8 is a schematic diagram of the apparatus for acquiring uplink transmission timing advance of the embodiment of this disclosure. Referring to FIG. 8, an apparatus 800 for acquiring uplink transmission timing advance includes: an acquiring unit 801 configured to obtain a timing advance command value ($T_A$), the $T_A$ being related to a first reference subcarrier spacing (SCS) used by a terminal equipment for calculating timing advance ($T_{TA}$); and a first transmitting unit 802 configured to transmit a timing advance command ($T_A$ command), the timing advance command including the timing advance command value.

In one implementation of this embodiment, the first reference SCS related to the $T_A$ and used for calculating the $T_{TA}$ is predefined or preconfigured. For example, it may be a reference SCS at the terminal equipment side when the TA command is effective; and for another example, it may be a reference SCS at the terminal equipment side when the network device transmits the TA command or the terminal equipment receives the TA command.

In this implementation, the reference SCS at the terminal equipment side may be the maximum or minimum SCS of the semi-statically configured uplink bandwidth part(s) (UL BWP(s)) in the timing advance group (TAG) to which the TA command corresponds, or may be the maximum or minimum SCS of the UL BWP(s) activated in the TAG to which the above TA command corresponds.

In one implementation of this embodiment, the first reference SCS related to the $T_A$ and used for calculating the $T_{TA}$ is an SCS designated by the network device.

In this implementation, as shown in FIG. 8, the apparatus 800 may further include:

a second transmitting unit 803 configured to transmit control signaling to the terminal equipment, indicating the terminal equipment via the control signaling that the first reference SCS related to the $T_A$, used for calculating the $T_{TA}$ and designated by the network device.

With the method of this embodiment, the network device transmits via the TA command the timing advance value ($T_A$) related to the reference SCS used by the terminal equipment in calculating the timing advance ($T_{TA}$), and it may be ensured that understanding for the reference SCS by the terminal equipment in calculating the $T_{TA}$ is in consistence with understanding for a reference SCS at the terminal equipment side in calculating the $T_{TA}$ by the network device, so as to assist the terminal equipment in obtaining accurate timing advance of uplink transmission.

Embodiment 4

The embodiment of this disclosure provides an apparatus for acquiring uplink transmission timing advance, which may be configured in a user equipment. As principles of the apparatus for solving problems are similar to that of the method of Embodiment 2, reference may be made to implementation of the method of Embodiment 2 for a particular implementation of this apparatus, with identical contents being not going to be described herein any further.

Figure 9:
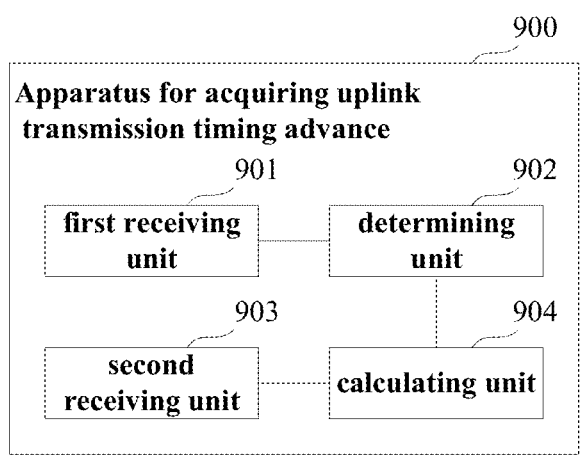
FIG. 9 is a schematic diagram of the apparatus for acquiring uplink transmission timing advance of Embodiment 4.

FIG. 9 is a schematic diagram of the apparatus for acquiring uplink transmission timing advance of the embodiment of this disclosure. Referring to FIG. 9, an apparatus 900 for acquiring uplink transmission timing advance includes: a first receiving unit 901 configured to receive a timing advance command (TA command), so as to obtain a timing advance command value ($T_A$) in the TA command; and a determining unit 902 configured to determine a first reference subcarrier spacing (SCS) related to the $T_A$ and used for calculating timing advance ($T_{TA}$).

In one implementation of this embodiment, the first reference subcarrier spacing (SCS) related to the $T_A$ and used for calculating the timing advance ($T_{TA}$) is predefined or preconfigured. For example, it may be a reference SCS at the terminal equipment side when the TA command is effective; and for another example, it may be a reference SCS at the terminal equipment side when the network device transmits the TA command or the terminal equipment receives the TA command.

In another implementation of this embodiment, the first reference SCS related to the $T_A$ and used for calculating the $T_{TA}$ is an SCS designated by the network device.

In this implementation, as shown in FIG. 9, the apparatus 900 may further include:

a second receiving unit 903 configured to receive control signaling transmitted by the network device, the control signaling indicating the first reference SCS related to the $T_A$, used for calculating the $T_{TA}$ and designated by the network device.

In one implementation of this embodiment, as shown in FIG. 9, the apparatus 900 may further include:

a calculating unit 904 configured to calculate the timing advance ($T_{TA}$) based on the first reference SCS related to the $T_A$ and used for calculating the $T_{TA}$.

In this implementation, the calculating unit 904 may further calculate or adjust the timing advance ($T_{TA}$) based on a reference SCS at the terminal equipment side to which an uplink transmission time corresponds.

In this implementation, the reference SCS at the terminal equipment side is a maximum or minimum SCS of semi-statically configured uplink bandwidth part(s) (UL BWP(s)) in a timing advance group (TAG) to which the TA command corresponds, or the reference SCS at the terminal equipment side is a maximum or minimum SCS of active UL BWP(s) in a TAG to which the TA command corresponds.

With the method of this embodiment, when the UL BWP of the uplink transmission of the terminal equipment changes, the network device and the terminal equipment may uniquely determine the timing advance after the UL BWP changes, and the network device may further adjust the uplink timing of the terminal equipment via the control signaling according to the reference value.

Embodiment 5

The embodiment of this disclosure provides a network device, such as a gNB (a base station in NR); wherein, the network device includes the apparatus for acquiring uplink transmission timing advance as described in Embodiment 3.

Figure 10:
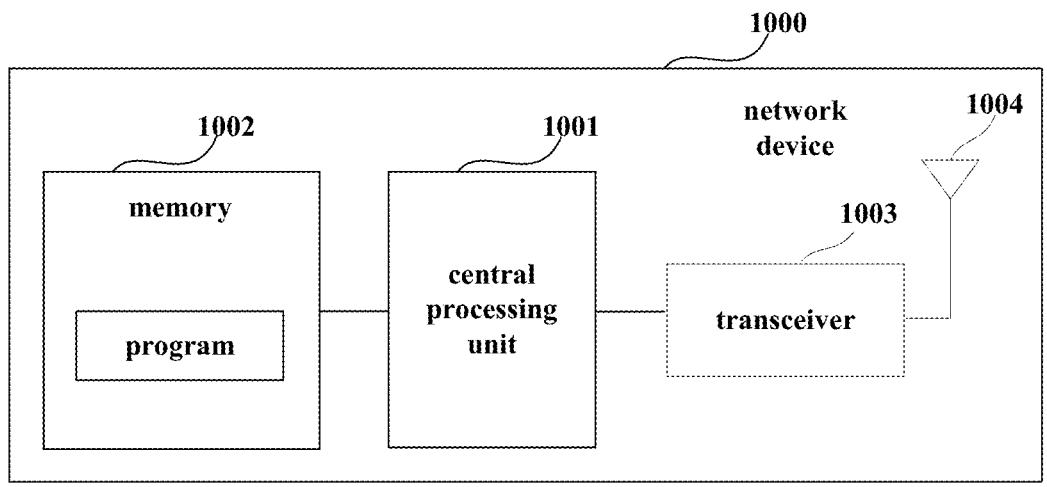
FIG. 10 is a schematic diagram of an implementation of the network device of Embodiment 5.

FIG. 10 is a schematic diagram of the network device of the embodiment of this disclosure. As shown in FIG. 10, a network device 1000 may include a central processing unit (CPU) 1001 and a memory 1002, the memory 1002 being coupled to the central processing unit 1001. The memory 1002 may store various data, and furthermore, it may store a program for data processing, and execute the program under control of the central processing unit 1001, so as to receive various information transmitted by a terminal equipment and transmit various information to the terminal equipment.

In one implementation, the functions of the apparatus for acquiring uplink transmission timing advance described in Embodiment 3 may be integrated into the central processing unit 1001, and the central processing unit 1001 executes the functions of the apparatus for acquiring uplink transmission timing advance described in Embodiment 3; wherein, the functions of the apparatus for acquiring uplink transmission timing advance are incorporated herein, which shall not be described herein any further.

In another implementation, the apparatus for acquiring uplink transmission timing advance described in Embodiment 3 and the central processing unit 1001 may be configured separately. For example, the apparatus for acquiring uplink transmission timing advance may be configured as a chip connected to the central processing unit 1001, with its functions being realized under control of the central processing unit 1001.

Furthermore, as shown in FIG. 10, the network device 1000 may include a transceiver 1003, and an antenna 1004, etc. Functions of the above components are similar to those in the related art, and shall not be described herein any further. It should be noted that the network device 1000 does not necessarily include all the parts shown in FIG. 10, and furthermore, the network device 1000 may include parts not shown in FIG. 10, and the related art may be referred to.

With the method of this embodiment, the network device transmits via the TA command the timing advance value ($T_A$) related to the reference SCS used by the terminal equipment in calculating the timing advance ($T_{TA}$), and it may be ensured that understanding for the reference SCS by the terminal equipment in calculating the $T_{TA}$ is in consistence with understanding for a reference SCS at the terminal equipment side in calculating the $T_{TA}$ by the network device, so as to assist the terminal equipment in obtaining accurate timing advance of uplink transmission.

Embodiment 6

The embodiment of this disclosure provides a terminal equipment, including the apparatus for acquiring uplink transmission timing advance as described in Embodiment 4.

Figure 11:
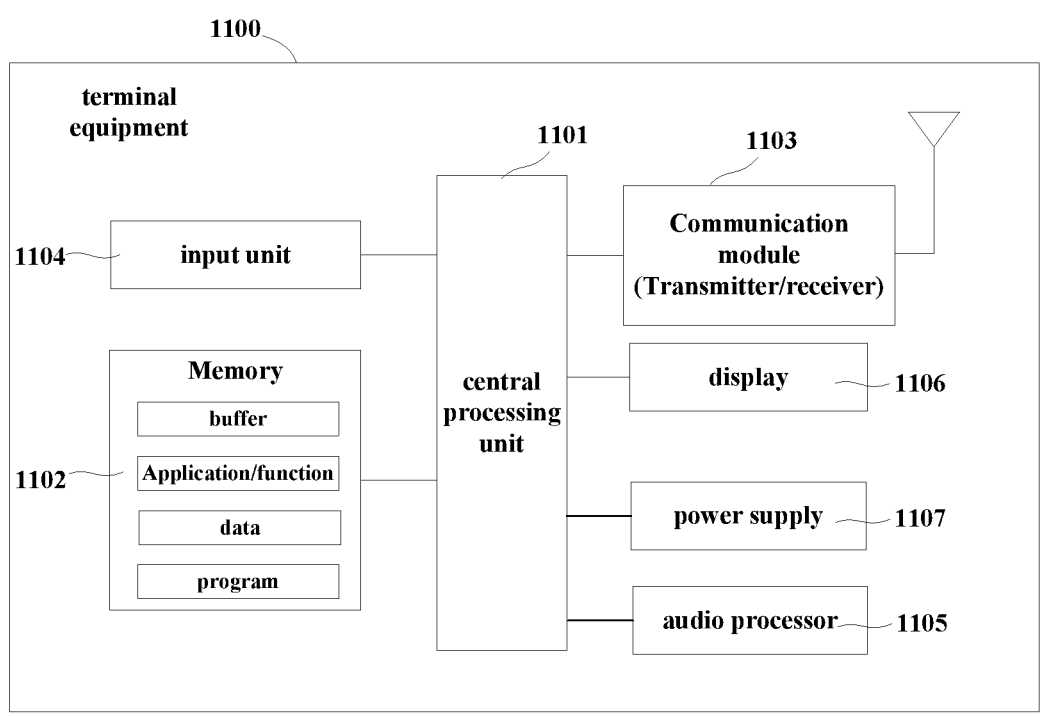
FIG. 11 is a schematic diagram of an implementation of the terminal equipment of Embodiment 6.

FIG. 11 is a schematic diagram of the terminal equipment of the embodiment of this disclosure. As shown in FIG. 11, a terminal equipment 1100 may include a central processing unit 1101 and a memory 1102, the memory 1102 being coupled to the central processing unit 1101. It should be noted that this figure is illustrative only, and other types of structures may also be used, so as to supplement or replace this structure and achieve a telecommunications function or other functions.

In one implementation, the functions of the apparatus for acquiring uplink transmission timing advance in Embodiment 4 may be integrated into the central processing unit 1101, and the central processing unit 1101 executes the functions of the apparatus for acquiring uplink transmission timing advance described in Embodiment 4; wherein, the functions of the apparatus for acquiring uplink transmission timing advance are incorporated herein, which shall not be described herein any further.

In another implementation, the apparatus for acquiring uplink transmission timing advance described in Embodiment 4 and the central processing unit 1101 may be configured separately. For example, the apparatus for acquiring uplink transmission timing advance may be configured as a chip connected to the central processing unit 1101, with its functions being realized under control of the central processing unit 1101.

As shown in FIG. 11, the terminal equipment 1100 may further include a communication module 1103, an input unit 1104, an audio processor 1105, a display 1106, and a power supply 1107. It should be noted that the terminal equipment 1100 does not necessarily include all the parts shown in FIG. 11, and the above components are not necessary; and furthermore, the terminal equipment 1100 may include parts not shown in FIG. 11, and the related art may be referred to.

As shown in FIG. 11, the central processing unit 1101 is sometimes referred to as a controller or control, which may include a microprocessor or other processor devices and/or logic devices, and the central processing unit 1101 receives input and controls operations of every component of the terminal equipment 1100.

The memory 1102 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 1101 may execute programs stored in the memory 1102, so as to realize information storage or processing, etc. Functions of other parts are similar to those of the related art, which shall not be described herein any further. The parts of the terminal equipment 1100 may be realized by specific hardware, firmware, software, or any combination thereof, without departing from the scope of the present disclosure.

With the terminal equipment of this embodiment, when the UL BWP of the uplink transmission of the terminal equipment changes, the network device and the terminal equipment may uniquely determine the timing advance after the UL BWP changes, and the network device may further adjust the uplink timing of the terminal equipment via the control signaling according to the reference value.

Embodiment 7

The embodiment of this disclosure provides a communication system, including a network device and a terminal equipment, the network device being, for example, the network device 1000 described in Embodiment 5, and the terminal equipment being, for example, the terminal equipment 1100 described in Embodiment 6.

In this embodiment, the network device may be, for example, a gNB in NR, and in addition to the functions of the apparatus for acquiring uplink transmission timing advance described in Embodiment 3, it further includes conventional components and functions of a network device, as shown in FIG. 5, which shall not be described herein any further.

In this embodiment, the terminal equipment may be, for example, a UE served by the gNB, and in addition to the functions of the apparatus for acquiring uplink transmission timing advance described in Embodiment 4, it further includes conventional components and functions of a terminal equipment, as shown in FIG. 6, which shall not be described herein any further.

With the communication system of this embodiment, normal transmission of data may be ensured.

Embodiment 8

Figure 12:
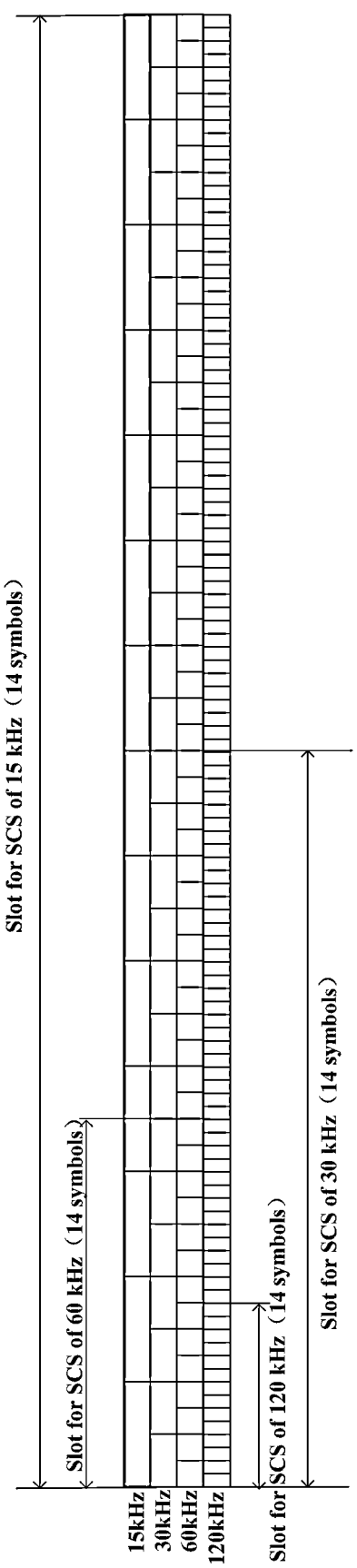
FIG. 12 is a schematic diagram of different symbol time lengths to which different SCSs in an NR system correspond.

In an LTE system, if a terminal equipment receives a TA command at an n-th subframe, it performs uplink transmission by using timing advance adjusted according to the TA command starting from an (n+6)-th subframe. However, in an NR system, it is defined that one slot includes 14 symbols, and one sub-slot includes less than 14 symbols. Moreover, the NR system supports a plurality of types of SCSs, and symbol time lengths to which different SCSs correspond are different. Accordingly, symbol time lengths of slots to which different SCSs correspond or sub-slots containing identical numbers of symbols are also different. FIG. 12 shows different symbol time lengths to which different SCSs correspond in the NR system; wherein, an absolute time length of a slot to which 15 kHz corresponds is 1 ms. If an interval between a time when the terminal equipment receives the TA command and a time when the terminal equipment starts to perform uplink transmission by using the uplink transmission timing calculated or adjusted based on the TA command is defined as the number of slots, sub-slots or symbols, it may cause the terminal equipment, after receiving a TA command, not to able to learn a definite time point to start to perform uplink transmission by using the adjusted timing advance.

Figure 13:
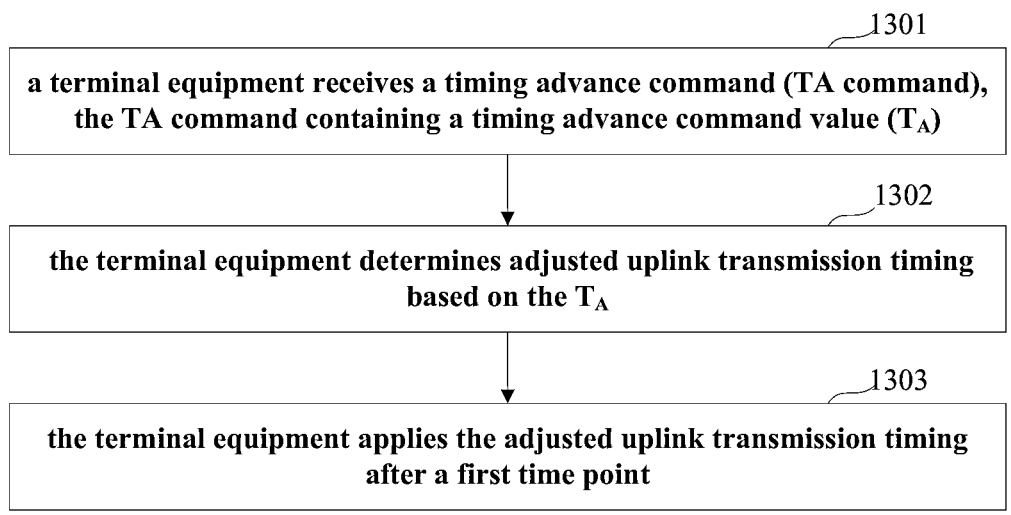
FIG. 13 is a schematic diagram of the method for adjusting uplink transmission timing advance of Embodiment 8.

The embodiment of this disclosure provides a method for adjusting uplink transmission timing advance, applicable to a terminal equipment. FIG. 13 is a schematic diagram of the method for adjusting uplink transmission timing advance of this embodiment. As shown in FIG. 13, the method includes:

step 1301: a terminal equipment receives a timing advance command (TA command), the TA command including a timing advance command value ($T_A$);

step 1302: the terminal equipment determines adjusted uplink transmission timing based on the $T_A$; and step 1303: the terminal equipment applies the adjusted uplink transmission timing after a first time point.

In this embodiment, an order of execution of the steps is not limited. For example, steps 1302 and 1303 may be executed at the same time, or step 1302 may be executed before step 1303.

In this embodiment, the timing advance command value ($T_A$) may also be referred to as a TA adjustment parameter, and its meaning is as described in Embodiment 1, which shall not be described herein any further.

In this embodiment, the terminal equipment may directly determine the adjusted timing advance, and further determine the uplink transmission timing; or the terminal equipment may determine an amount of adjustment relative to current timing advance, and further determine the uplink transmission timing, which are not limited in this embodiment.

In this embodiment, the first time point is a leading edge of a first time unit when the adjusted uplink transmission timing is applied.

In one implementation of this embodiment, a position of the first time point may be correlated with a second reference SCS of the terminal equipment.

In this implementation, the position of the first time point may possibly be correlated with the second reference SCS with respect one or more of the following.

It is assumed that the terminal equipment receives the TA command at the n-th time unit, and the terminal equipment starts to apply the adjusted uplink transmission timing at the (n+N)-th time unit to perform uplink transmission, n is a natural number and N is a positive integer (e.g. N=5, 6, 8, 16, 18, 20). If the time unit is time slot or sub-time slot, the position of the first time point is a leading edge of the (n+N)-th time unit based on the second reference SCS. As shown in FIG. 12, the lengths of time units to which different SCSs correspond are different at this time, and therefore, the positions of the first time point obtained based on values of different second reference SCSs are different.

Alternatively, intervals to which different SCSs correspond are different, the intervals being between a time unit when the terminal equipment receives the TA command and a time unit when the terminal equipment starts to apply the uplink transmission timing adjusted based on the TA command to perform uplink transmission. For example, for an SCS of 15 kHz, the terminal equipment receives the TA command at the n-th time unit, and applies the adjusted uplink transmission timing to perform uplink transmission at an (n+N1)-th time unit; and for an SCS of 30 kHz, the terminal equipment receives the TA command at the n-th time unit, and applies the adjusted uplink transmission timing to perform uplink transmission at an (n+N2)-th time unit; where, N1 is unequal to N2.

Alternatively, time units on which intervals to which different SCSs correspond are based are different, the intervals being between the terminal equipment receiving the TA command and starting to apply the uplink transmission timing adjusted based on the TA command to perform uplink transmission. For example, for an SCS of 15 kHz, the terminal equipment receives the TA command at the n-th subframe, and applies the adjusted uplink transmission timing to perform uplink transmission at an (n+N1)-th subframe; and for an SCS of 30 kHz, the terminal equipment receives the TA command at an n-th slot, and applies the adjusted uplink transmission timing to perform uplink transmission at an (n+N2)-th slot; where, N1 is equal or unequal to N2.

In an example, the above second reference SCS may be predefined or preconfigured. Being pre-defined refers to that the second reference SCS is preset in the terminal equipment before the terminal equipment leaving factory, and reference may be made to the above-described manner of predefining or preconfiguring the first reference SCS for predefining or preconfiguring the second reference SCS, which shall not be described herein any further. In this implementation, the second reference SCS may be identical to or different from the first reference SCS, and they may be independent of each other. As described in Embodiment 1, the first reference SCS is the reference SCS of the terminal equipment in calculating the timing advance ($T_{T4}$).

In another example, the second reference SCS may also be indicated via first configuration information. In this implementation, the terminal equipment may further receive the first configuration information transmitted by the network device, the first configuration information being used to indicate the second reference SCS or being used by the terminal equipment to obtain the second reference SCS.

In this implementation, when the first configuration information is used to indicate the second reference SCS, the first configuration information may be carried in at least one piece of the following information or signaling: a physical layer control channel, MAC signaling, RRC signaling, system information, or broadcast information. Reference may be made to existing standards for definitions or implementations of these signaling.

In this implementation, when the first configuration information is used for the terminal equipment to obtain the second reference SCS, the first configuration information may be further used to indicate an active uplink bandwidth part (BWP) to the terminal equipment, the second reference SCS being an SCS of the active uplink BWP (UL BWP).

In another implementation of this embodiment, the position of the first time point may also be related to an operational band of a serving cell of the terminal equipment, or may be related to the second reference SCS and an operational band of a serving cell at the same time.

For example, when the operational band (referred to as band 1) of the serving cell is higher than 6 GHz, the position of the first time point may be a leading edge of an (n+N1)-th time unit based on an SCS (such as SCS_4); and when the operational band (referred to as band 2) of the serving cell is lower than 6 GHz, the position of the first time point may be a leading edge of an (n+N2)-th time unit based on an SCS (such as SCS_5). In this example, SCS_4 and SCS_5 may be identical or different, and N1 is unequal to N2. That is, in this example, the position of the first time point is only related to the operational band of the serving cell of the terminal equipment.

For another example, when the operational band of the serving cell is higher than 6 GHz, the position of the first time point may be a leading edge of an (n+N1)-th time unit; and when the operational band of the serving cell is lower than 6 GHz, the position of the first time point may be a leading edge of an (n+N2)-th time unit, and an index of the time unit is related to the second reference SCS determined according to a predefined rule. That is, in this example, the position of the first time point is simultaneously related to the above second reference SCS and the operational band of the serving cell.

In this embodiment, when the first reference SCS or the second reference SCS is the maximum or minimum SCS of the active UL BWP(s) in the TAG to which the TA command corresponds, as the first reference SCS or the second reference SCS may change along with activation/deactivation of UL BWP(s), and the position of the first time point when the TA command starts to be effective relative to a position of a second time point when a UL BWP activation indication is effective needs to be coordinated.

In one implementation of this embodiment, the terminal equipment may further receive second configuration information transmitted by the network device, the second configuration information being used to indicate the active uplink bandwidth part (UL BWP) to the terminal equipment.

In this implementation and the above implementation in which the active UL BWP is indicated via the first configuration information, the terminal equipment may use the active UL BWP after the second time point, and at this moment, the second time point is identical to the first time point or after the above first time point on a timeline. Furthermore, the terminal equipment may also use the active UL BWP starting from the (n+k)-th time unit; where, n is sequence number of a time unit when the terminal equipment receives the second configuration information, and k is greater than or equal to a sum of time units from after the terminal equipment receives the TA command to before the above-described first time point. Here, the time unit may be a symbol, a slot, a sub-slot, or a sub-frame, and both n and k are natural numbers.

In this implementation, the terminal equipment may receive the second configuration information before the above first time point, and the second configuration information may be carried by a physical layer control channel or MAC layer signaling or RRC layer signaling; however, this embodiment is not limited thereto.

With the method of this embodiment, the terminal equipment may learn a definite time point when the adjusted timing advance is started to be used to perform uplink transmission after receiving a TA command.

Embodiment 9

In the above embodiment, when the first reference SCS is the reference SCS at the UE side when the TA command in the TAG associated with the TA command is effective and the reference SCS at the UE side is the maximum or minimum SCS of the active UL BWP(s), in order to improve accuracy of the uplink timing advance, the network device may indicate the active UL BWP(s) before transmitting the TA command, so that a time when the TA command is effective is aligned with a time of the active UL BWP(s).

Figure 14:
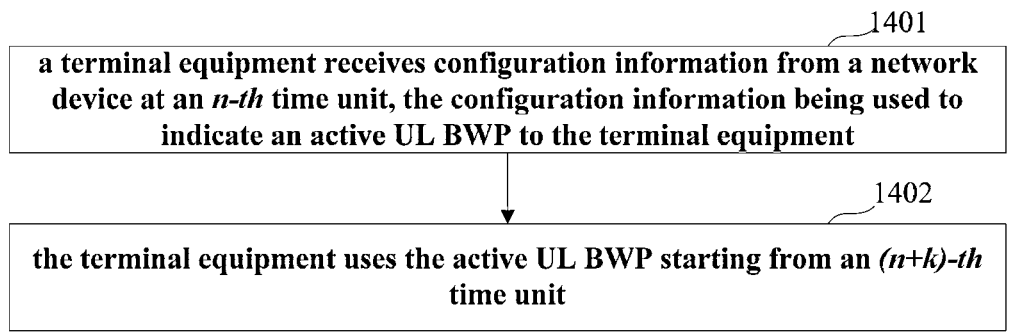
FIG. 14 is a schematic diagram of the activation method for an uplink bandwidth part of Embodiment 9.

The embodiment of this disclosure provides an activation method for an uplink bandwidth part (BWP), applicable to a terminal equipment. FIG. 14 is a schematic diagram of the activation method for an uplink bandwidth part (BWP) of this embodiment. As shown in FIG. 14, the method includes:

step 1401: a terminal equipment receives configuration information from a network device at an n-th time unit, the configuration information being used to indicate an active UL BWP to the terminal equipment; and step 1402: the terminal equipment uses the active UL BWP starting from an (n+k)-th time unit; where, n is a natural number, k is a positive integer and is greater than or equal to K (e.g. K=5, 6, 8, 16, 18, 20), the time unit is a symbol, a slot, a sub-slot, or a subframe.

K is the number of time units between receiving a timing advance command and applying uplink transmission timing which has been adjusted based on the timing advance command, that is, if the terminal equipment receives the TA command at the n-th time unit, at the (n+k)-th time unit, it applies the uplink transmission timing which has been adjusted based on the TA command.

In this embodiment, the terminal equipment may receive the timing advance command (TA command) after the n-th time unit and before the (n+k)-th time unit.

With the method of this embodiment, the effective time of the TA command may be made to be aligned with the time of the active uplink BWP.

Embodiment 10

The embodiment of this disclosure provides an apparatus for adjusting uplink transmission timing advance. As principles of the apparatus for solving problems are similar to that of the method of Embodiment 8, reference may be made to implementation of the method of Embodiment 8 for a particular implementation of this apparatus, with identical contents being not going to be described herein any further.

Figure 15:
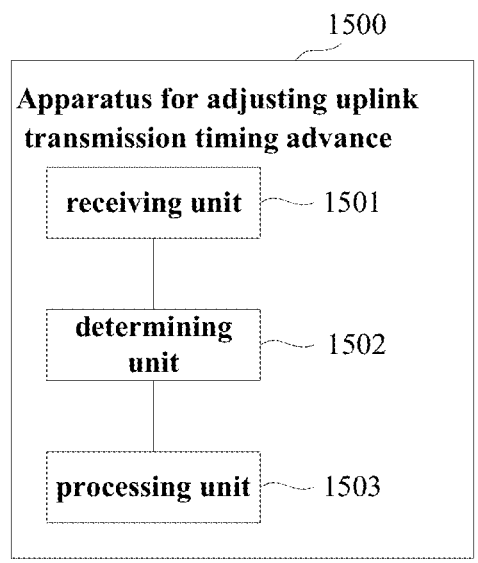
FIG. 15 is a schematic diagram of the apparatus for adjusting uplink transmission timing advance of Embodiment 10.

FIG. 15 is a schematic diagram of the apparatus for adjusting uplink transmission timing advance of this embodiment. As shown in FIG. 15, an apparatus 1500 for adjusting uplink transmission timing advance includes:

a receiving unit 1501 configured to receive a timing advance command (TA command), the TA command including a timing advance command value ($T_A$);

a determining unit 1502 configured to determine adjusted uplink transmission timing based on the $T_A$; and a processing unit 1503 configured to apply the adjusted uplink transmission timing after a first time point.

In this embodiment, the first time point is correlated with a second reference SCS, and aspect/aspects with which they are correlated to is/are as described in Embodiment 8, which shall not be described herein any further; and/or, the first time point is correlated with an operational band of a serving cell of the terminal equipment.

In this embodiment, the second reference SCS is identical to or different from a first reference SCS, the first reference SCS being a reference SCS of the terminal equipment in calculating timing advance ($T_{TA}$).

In one implementation, the second reference SCS is predefined or preconfigured. Being pre-defined refers to that the second reference SCS is preset in the terminal equipment before the terminal equipment leaving factory.

In another implementation, the second reference SCS is obtained according to configuration of a network device. In this implementation, the receiving unit 1501 may further receive first configuration information transmitted by the network device, the first configuration information being used to indicate the second reference SCS, or being used for the terminal device to obtain the second reference SCS.

In this implementation, when the first configuration information is used to indicate the second reference SCS, the first configuration information is carried in at least one piece of the following information or signaling: a physical layer control channel, MAC signaling, RRC signaling, system information, or broadcast information.

In this implementation, when the first configuration information is used for the terminal device to obtain the second reference SCS, the first configuration information is further used to indicate an active uplink bandwidth part (BWP) to the terminal device, the second reference SCS being an SCS of the active UL BWP.

In another implementation of this embodiment, the receiving unit 1501 may further receive second configuration information transmitted by the network device, the second configuration information being used to indicate an active uplink bandwidth part (BWP) to the terminal device.

In this implementation, the processing unit 1503 may use the active UL BWP after a second time point, the second time point being identical to the first time point or after the first time point on a timeline.

In this implementation, the processing unit 1503 may also use the active UL BWP starting from an (n+k)-th time unit; where, n is a sequence number of a time unit of the terminal device in receiving the second configuration information, k is greater than or equal to a sum of time units after the terminal device receives the TA command and before the first time point, and the time unit is a symbol, a slot, a sub-slot, or a subframe, and n and k are natural numbers.

In this implementation, the receiving unit 1501 may receive the second configuration information before the first time point. And the second configuration information may be carried in a physical layer control channel, or MAC signaling, or RRC signaling.

With the apparatus of this embodiment, the terminal equipment may learn a definite time point when the adjusted timing advance is started to be used to perform uplink transmission after receiving a TA command.

Embodiment 11

The embodiment of this disclosure provides an activation apparatus for an uplink bandwidth part (BWP). As principles of the apparatus for solving problems are similar to that of the method of Embodiment 9, reference may be made to implementation of the method of Embodiment 9 for a particular implementation of this apparatus, with identical contents being not going to be described herein any further.

Figure 16:
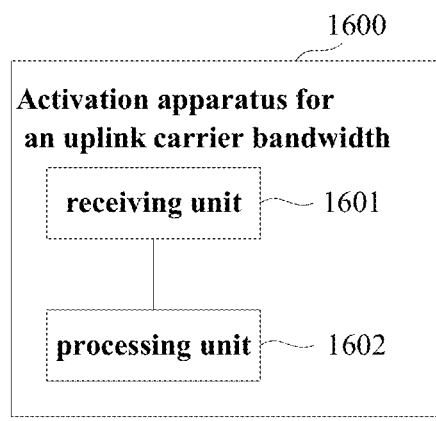
FIG. 16 is a schematic diagram of the activation apparatus for an uplink bandwidth part of Embodiment 11.

FIG. 16 is a schematic diagram of the activation apparatus for an uplink bandwidth part of this embodiment. As shown in FIG. 16, an activation apparatus 1600 for an uplink bandwidth part includes:

a receiving unit 1601 configured to receive configuration information from a network device at an n-th time unit, the configuration information being used to indicate an activated UL BWP to the terminal device; and a processing unit 1602 configured to use the activated UL BWP starting from an (n+k)-th time unit; where, n is a natural number, k is a positive integer and is greater than or equal to K, K is the number of time units between receiving a timing advance command and applying uplink transmission timing which has been adjusted based on the timing advance command, and the time unit is a symbol, a slot, a sub-slot, or a subframe.

In this embodiment, the receiving unit 1601 may receive the timing advance command (TA command) after the n-th time unit and before the (n+k)-th time unit.

With the apparatus of this embodiment, the effective time of the TA command may be made to be aligned with the time of the active UL BWP.

Embodiment 12

The embodiment of this disclosure provides a terminal equipment, including the apparatus as described in Embodiment 10 or 11.

Figure 17:
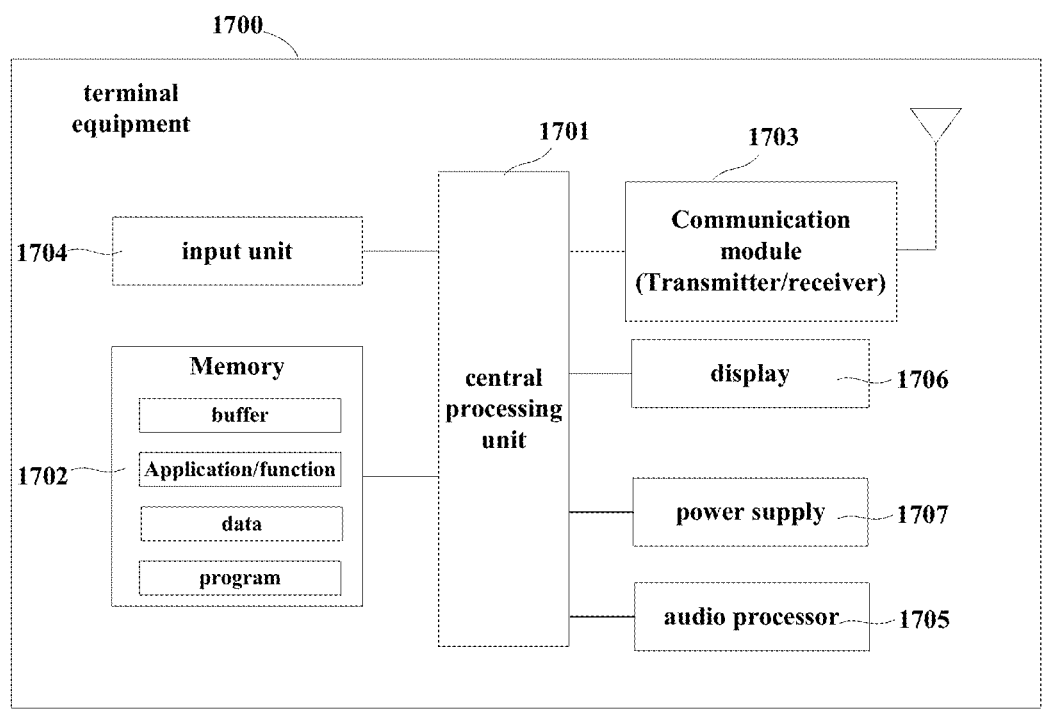
FIG. 17 is a schematic diagram of the terminal equipment of Embodiment 12.

FIG. 17 is a schematic diagram of the terminal equipment of the embodiment of this disclosure. As shown in FIG. 17, a terminal equipment 1700 may include a central processing unit 1701 and a memory 1702, the memory 1702 being coupled to the central processing unit 1701. It should be noted that this figure is illustrative only, and other types of structures may also be used, so as to supplement or replace this structure and achieve a telecommunications function or other functions.

In one implementation, the functions of the apparatus in Embodiment 10 or 11 may be integrated into the central processing unit 1701, and the central processing unit 1701 executes the functions of the apparatus in Embodiment 10 or 11; wherein, the functions of the apparatus in Embodiment 10 or 11 are incorporated herein, which shall not be described herein any further.

In another implementation, the apparatus in Embodiment 10 or 11 and the central processing unit 1701 may be configured separately. For example, the apparatus in Embodiment 10 or 11 may be configured as a chip connected to the central processing unit 1701, with its functions being realized under control of the central processing unit 1701.

As shown in FIG. 17, the terminal equipment 1700 may further include a communication module 1703, an input unit 1704, an audio processor 1705, a display 1706, and a power supply 1707. It should be noted that the terminal equipment 1700 does not necessarily include all the parts shown in FIG. 17, and the above components are not necessary; and furthermore, the terminal equipment 1700 may include parts not shown in FIG. 17, and the related art may be referred to.

As shown in FIG. 17, the central processing unit 1701 is sometimes referred to as a controller or control, which may include a microprocessor or other processor devices and/or logic devices, and the central processing unit 1701 receives input and controls operations of every component of the terminal equipment 1700.

The memory 1702 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 1701 may execute programs stored in the memory 1702, so as to realize information storage or processing, etc. Functions of other parts are similar to those of the related art, which shall not be described herein any further. The parts of the terminal equipment 1700 may be realized by specific hardware, firmware, software, or any combination thereof, without departing from the scope of the present disclosure.

With the terminal equipment of this embodiment, when the apparatus described in Embodiment 10 is configured, after receiving a TA command, the terminal equipment may learn a definite time point when the adjusted timing advance is started to be used to perform uplink transmission. And when the apparatus described in Embodiment 11 is configured, the effective time of the TA command may be made to be aligned with the time of the active uplink BWP Embodiment 13

The embodiment of this disclosure provides a communication system, including a network device and a terminal equipment, the network device being, for example, the network device 1000 described in Embodiment 5, and the terminal equipment being, for example, the terminal equipment 1100 described in Embodiment 12.

In this embodiment, the network device may be, for example, a gNB in NR, and in addition to the functions of the apparatus for acquiring uplink transmission timing advance described in Embodiment 3, it further includes conventional components and functions of a network device, as shown in FIG. 5, which shall not be described herein any further.

In this embodiment, the terminal equipment may be, for example, a UE served by the gNB, and in addition to the functions of the apparatus in Embodiment 4 or 10 or 11, it further includes conventional components and functions of a terminal equipment, as shown in FIG. 6 or 12, which shall not be described herein any further.

With the communication system of this embodiment, normal transmission of data may be ensured.

An embodiment of the present disclosure provides a computer readable program, which, when executed in a network device, may cause a computer to carry out the method as described in Embodiment 1 in the network device.

An embodiment of the present disclosure provides a computer storage medium, including a computer readable program, which may cause a computer to carry out the method as described in Embodiment 1 in a network device.

An embodiment of the present disclosure provides a computer readable program, which, when executed in a terminal equipment, may cause a computer to carry out the method as described in Embodiment 2, or 8, or 9, in the terminal equipment.

An embodiment of the present disclosure provides a computer storage medium, including a computer readable program, which may cause a computer to carry out the method as described in Embodiment 2, or 8, or 9, in a terminal equipment.

The above apparatuses and methods of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 8 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. An apparatus for adjusting uplink transmission timing advance, configured in a terminal equipment, including:
  a receiving unit configured to receive a timing advance command (TA command), the TA command including a timing advance command value ($T_A$);
  a determining unit configured to determine adjusted uplink transmission timing based on the $T_A$; and
  a processing unit configured to apply the adjusted uplink transmission timing after a first time point,
  wherein, the first time point is correlated with a second reference SCS, the second reference SCS is predefined or preconfigured; and/or
  the first time point is correlated with an operational band of a serving cell of the terminal equipment.

Supplement 2. The apparatus according to supplement 1, wherein, the second reference SCS being predefined refers to that the SCS is preset in the terminal equipment before the terminal equipment leaving factory.

Supplement 3. The apparatus according to supplement 1, wherein,
  the receiving unit further receives first configuration information transmitted by a network device, the first configuration information being used to indicate the second reference SCS, or being used for the terminal device to obtain the second reference SCS.

Supplement 4. The apparatus according to any one of supplements 1-3, wherein, the second reference SCS is identical to or different from a first reference SCS, the first reference SCS being a reference SCS of the terminal equipment in calculating timing advance ($T_{TA}$).

Supplement 5. The apparatus according to supplement 3, wherein, when the first configuration information is used to indicate the second reference SCS, the first configuration information is carried in at least one piece of the following information or signaling: a physical layer control channel, MAC signaling, RRC signaling, system information, or broadcast information.

Supplement 6. The apparatus according to supplement 3, wherein, when the first configuration information is used for the terminal device to obtain the second reference SCS, the first configuration information is further used to indicate an active uplink bandwidth part (BWP) to the terminal device, the second reference SCS being an SCS of the active UL BWP.

Supplement 7. The apparatus according to supplement 1, wherein,
  the receiving unit further receives second configuration information transmitted by the network device, the second configuration information being used to indicate an active uplink bandwidth part (BWP) to the terminal device.

Supplement 8. The apparatus according to supplement 6 or 7, wherein,
  the processing unit uses the active UL BWP after a second time point, the second time point being identical to the first time point or after the first time point on a timeline.

Supplement 9. The apparatus according to supplement 6 or 7, wherein,
  the processing unit uses the active UL BWP starting from an (n+k)-th time unit; where, n is a sequence number of a time unit of the terminal device in receiving the second configuration information, k is greater than or equal to a sum of time units after the terminal device receives the TA command and before the first time point, and the time unit is a symbol, a slot, a sub-slot, or a subframe, and n and k are natural numbers.

Supplement 10. The apparatus according to any one of supplements 7-9, wherein,
  the receiving unit receives the second configuration information before the first time point.

Supplement 11. The apparatus according to any one of supplements 7-10, wherein,
  the second configuration information is carried in a physical layer control channel, or MAC signaling, or RRC signaling.

Supplement 12. An activation apparatus for an uplink bandwidth part (BWP), configured in a terminal equipment, including:
  a receiving unit configured to receive configuration information from a network device at an n-th time unit, the configuration information being used to indicate an activated UL BWP to the terminal device; and
  a processing unit configured to use the activated UL BWP starting from an (n+k)-th time unit;
  where, n is a natural number, k is a positive integer and is greater than or equal to K, K is the number of time units between receiving a timing advance command and applying uplink transmission timing which has been adjusted based on the timing advance command, and the time unit is a symbol, a slot, a sub-slot, or a subframe.

Supplement 13. The apparatus according to supplement 12, wherein, the receiving unit receives the timing advance command (TA command) after the n-th time unit and before the (n+k)-th time unit.

What is claimed is:

1. A terminal device comprising:
   a receiver configured to receive a timing advance command (TA command) including a timing advance command value ($T_A$) for a timing advance group (TAG) on uplink slot n;
   a processor configured to:
   adjust uplink transmission timing based on the $T_A$, and a first subcarrier spacing (SCS),
   apply the adjusted uplink transmission timing from the beginning of uplink slot n+N, wherein N is determined with respect to a second SCS, and uplink slot n is determined with respect to the second SCS,
   wherein the second SCS is a minimum SCS among SCSs of all configured UL bandwidth parts (BWPs) for all uplink carriers in the TAG.

2. The terminal device according to claim 1, wherein the second SCS is predefined or preconfigured.

3. The terminal device according to claim 1, wherein, the second SCS is predefined referring to a reference SCS is preset in the terminal device before the terminal device leaving factory.

4. The terminal device according to claim 1, wherein, the receiver receives first configuration information transmitted by a network device, the first configuration information being used to indicate the second SCS, or being used for the terminal device to obtain the second SCS.

5. The terminal device according to claim 1, wherein, the second SCS is different from the first SCS.

6. The terminal device according to claim 1, the first SCS is the largest SCS of a plurality of uplink bandwidth parts.

7. The terminal device according to claim 1, wherein n is natural number, and N is positive integer.

8. The terminal device according to claim 1, wherein, the first configuration information is transmitted using by a physical layer control channel, media access control signaling, radio resource control signaling, system information, or broadcast signaling.

9. The terminal device according to claim 1, wherein in a case that the terminal device changes an active uplink bandwidth part after applying the adjusted uplink transmission timing, the processor assumes a same absolute timing advance command value before and after the active uplink bandwidth part change.

10. The terminal device according to claim 1, wherein in a case that the terminal device changes an active first uplink bandwidth part to a second uplink bandwidth part between a first time of the receiving the TA command and a second time of the applying the adjusted uplink transmission timing, the first SCS corresponds to a SCS of the second uplink bandwidth part.

11. A network device comprising:
   a processor configured to obtain a timing advance command value ($T_A$) for a timing advance group (TAG) that is related to a first subcarrier spacing (SCS) used by a terminal device for calculating timing advance ($T_{TA}$); and
   a transmitter configured to transmit a timing advance command (TA command) for the TAG including the $T_A$
   wherein the terminal device is configured to:
   receive the timing advance command (TA command) for the TAG on uplink slot n; adjust uplink transmission timing based on the timing advance command value ($T_A$) and the first SCS;
   apply the adjusted uplink transmission timing from the beginning of uplink slot n+N, wherein N is determined with respect to a second SCS, and uplink slot n is determined with respect to the second SCS,
   wherein the second SCS is a minimum SCS among the SCSs of all configured UL bandwidth parts (BWPs) for all uplink carriers in the TAG.

12. A communication system comprising:
   a terminal device; and
   a network device configured to communicate the terminal device, wherein
   the terminal device includes:
   a receiver configured to receive a timing advance command (TA command) including a timing advance command value ($T_A$) for a timing advance group (TAG) on uplink slot n;
   a processor configured to:
   adjust uplink transmission timing based on the $T_A$, and a first subcarrier spacing (SCS),
   apply the adjusted uplink transmission timing from the beginning of uplink slot n+N, wherein N is determined with respect to a second SCS, and uplink slot n is determined with respect to the second SCS,
   wherein the second SCS is a minimum SCS among SCSs of all configured UL bandwidth parts (BWPs) for all uplink carriers in the TAG.

* * * * *